United States Patent [19]
Tair

[11] Patent Number: 5,567,002
[45] Date of Patent: Oct. 22, 1996

[54] VEHICLE COVER AND TENT DEVICE

[76] Inventor: Yasser Tair, P.O.Box 343, Westminster, Calif. 92684

[21] Appl. No.: 297,577
[22] Filed: Aug. 29, 1994
[51] Int. Cl.⁶ ..................................................... B60J 11/00
[52] U.S. Cl. ........................................... 296/136; 296/98
[58] Field of Search .................... 296/136, 98; 150/166; 160/370.22; 135/88

[56] References Cited

U.S. PATENT DOCUMENTS

| | | | |
|---|---|---|---|
| 1,918,423 | 7/1933 | Persinger | 296/136 X |
| 4,858,985 | 8/1989 | Wojcik | 296/136 |
| 4,900,081 | 2/1990 | Lee | 296/136 |
| 5,022,700 | 6/1991 | Fasiska et al. | 296/136 X |
| 5,078,446 | 1/1992 | Walter | 296/136 X |

FOREIGN PATENT DOCUMENTS

| | | | |
|---|---|---|---|
| 4208636 | 7/1992 | Japan | 296/136 |
| 1522367 | 8/1978 | United Kingdom | 296/136 |

*Primary Examiner*—Joseph D. Pape

[57] ABSTRACT

A cover for protecting a vehicle's exterior and interior from the elements. The cover is wound around a roller within a housing. The housing is attached to the trunk lid by a pair of hinge hooks which enable the entire housing to be rotated between a position outside of the trunk for deployment of the cover and a position inside of the trunk for storage. When the housing is positioned outside of the trunk the cover may be withdrawn from the housing, pulled forward over the vehicle and secured to the bumper for protecting the vehicle from the elements. Once the cover is deployed the empty housing may be rotated back into the trunk and the trunk then closed. The cover device may also be used as a tent by withdrawing the cover from the housing rearwardly and supporting the cover by a pair of poles.

4 Claims, 7 Drawing Sheets

5,567,002

VEHICLE COVER AND TENT DEVICE

BACKGROUND OF THE INVENTION

The present invention relates to an automobile cover device and a mounting system therefor which can also be used as a tent.

SUMMARY OF THE INVENTION

The main object of the invention is to protect a vehicle's exterior and interior from the elements such as rain, sun, etc. by covering the top and sides of the vehicle with a cover comprising a sheet of material. The cover is wound around a roller within a housing. The housing is attached to the trunk lid by a pair of hinge hooks which enable the entire housing to be rotated between a position outside of the trunk for deployment of the cover and a position inside of the trunk for storage. When the housing is positioned outside of the trunk the cover may be withdrawn from the housing, pulled forward over the vehicle and secured to the bumper for protecting the vehicle from the elements. Once the cover is deployed the empty housing may be rotated back into the trunk and the trunk then closed.

Another object of the invention is to use the cover device as a tent. To utilize the device as a tent simply position the housing outside of the trunk withdraw the cover from the housing rearwardly and support the cover by a pair of poles.

After use the cover is rewound onto the roller and the housing is rotated inside of the vehicle for storage.

A further object of the invention is in case of an emergency such as a broken down vehicle, flat tire or the like, a help message such as help, help needed or the like may be written on the housing using a phosphoric material. The housing could then be rotated out of the trunk so that the message could be seen any time of the day.

DETAILED DESCRIPTION OF THE PREFERRED EMBODIMENT

Figure 1:
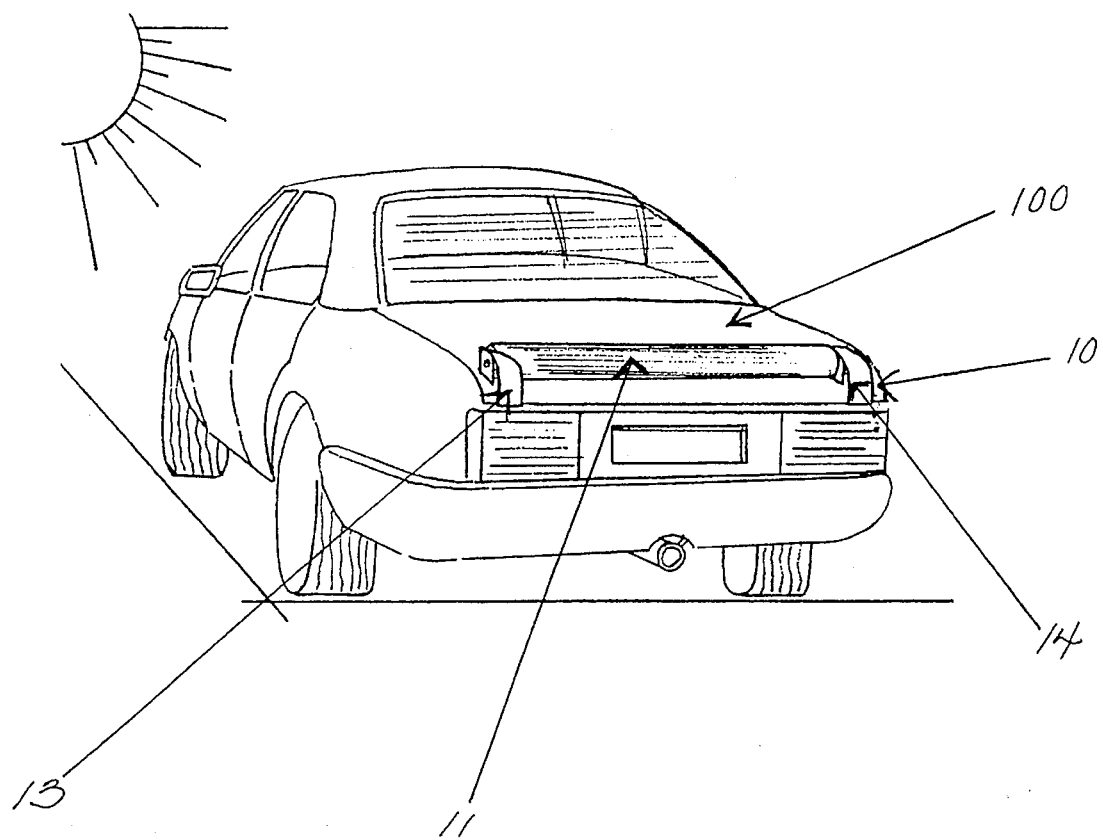
FIG. 1 is a perspective view of a rear portion of the vehicle showing the cover roller housing of the present invention in a position outside of the trunk.
Figure 2:
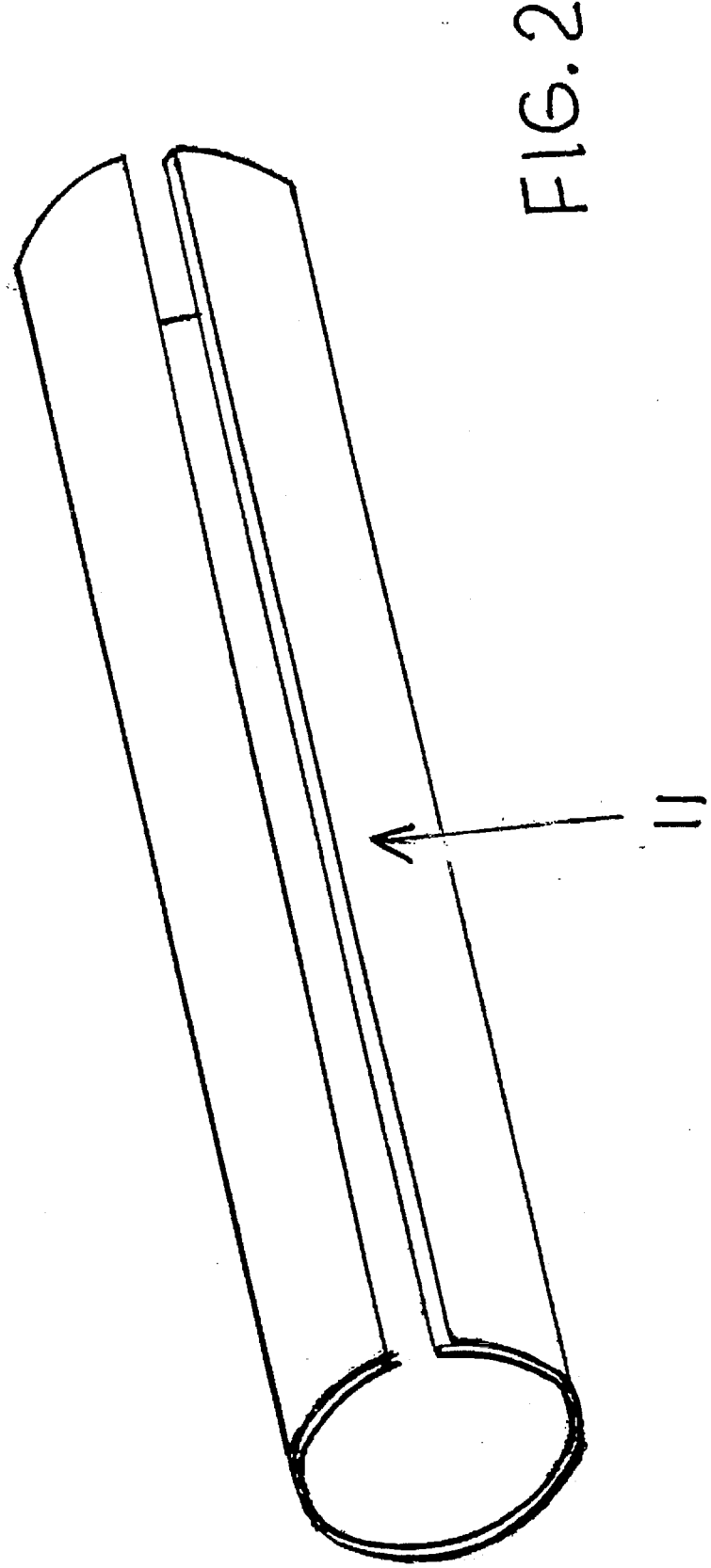
FIG. 2 is a perspective view of the roller housing of the present invention.
Figure 3:
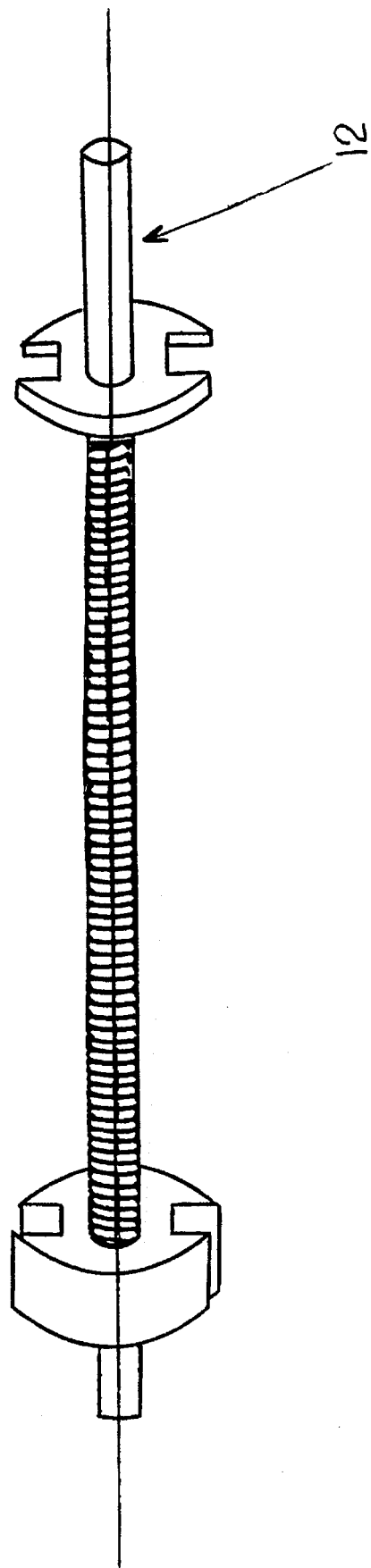
FIG. 3 is a perspective view of the roller of the present invention.
Figure 4:
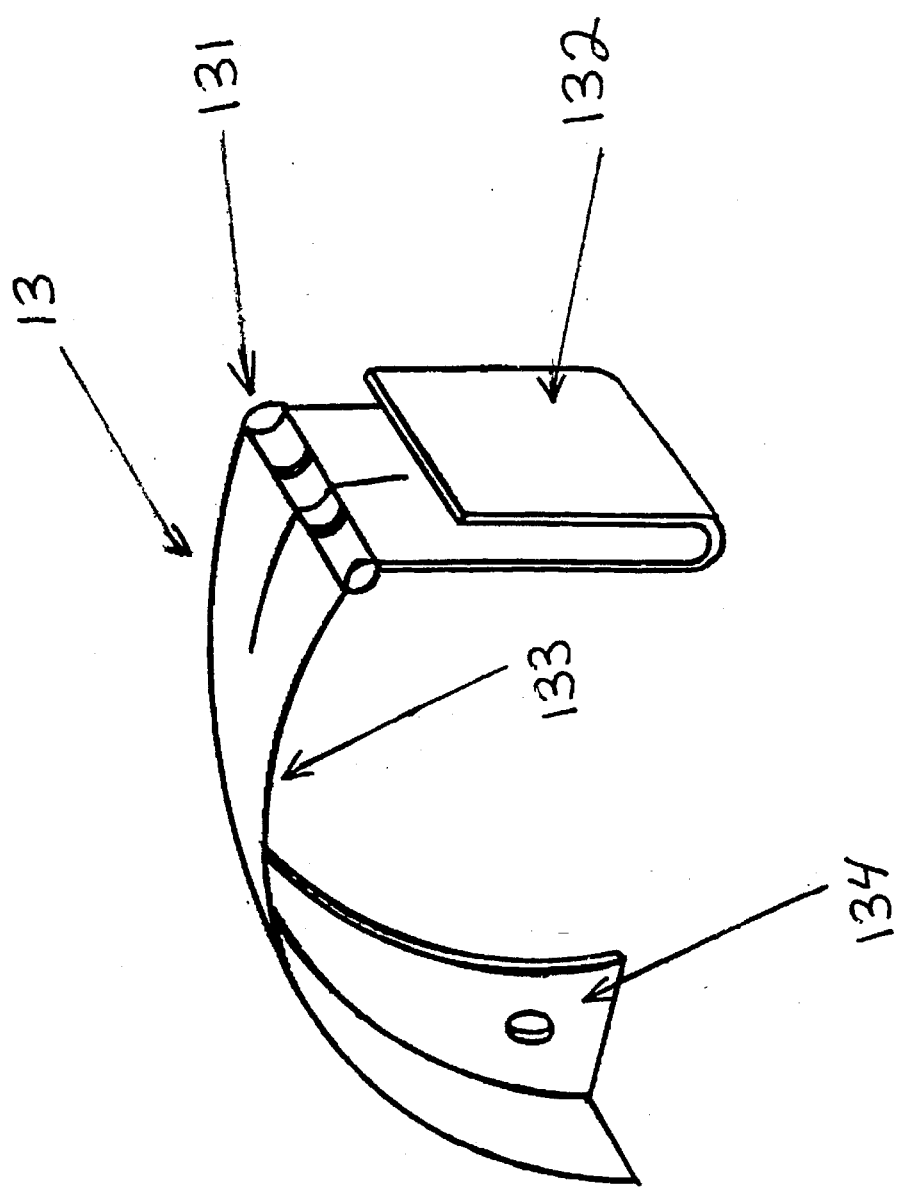
FIG. 4 is a perspective view of the left hinge hook of the present invention.
Figure 5:
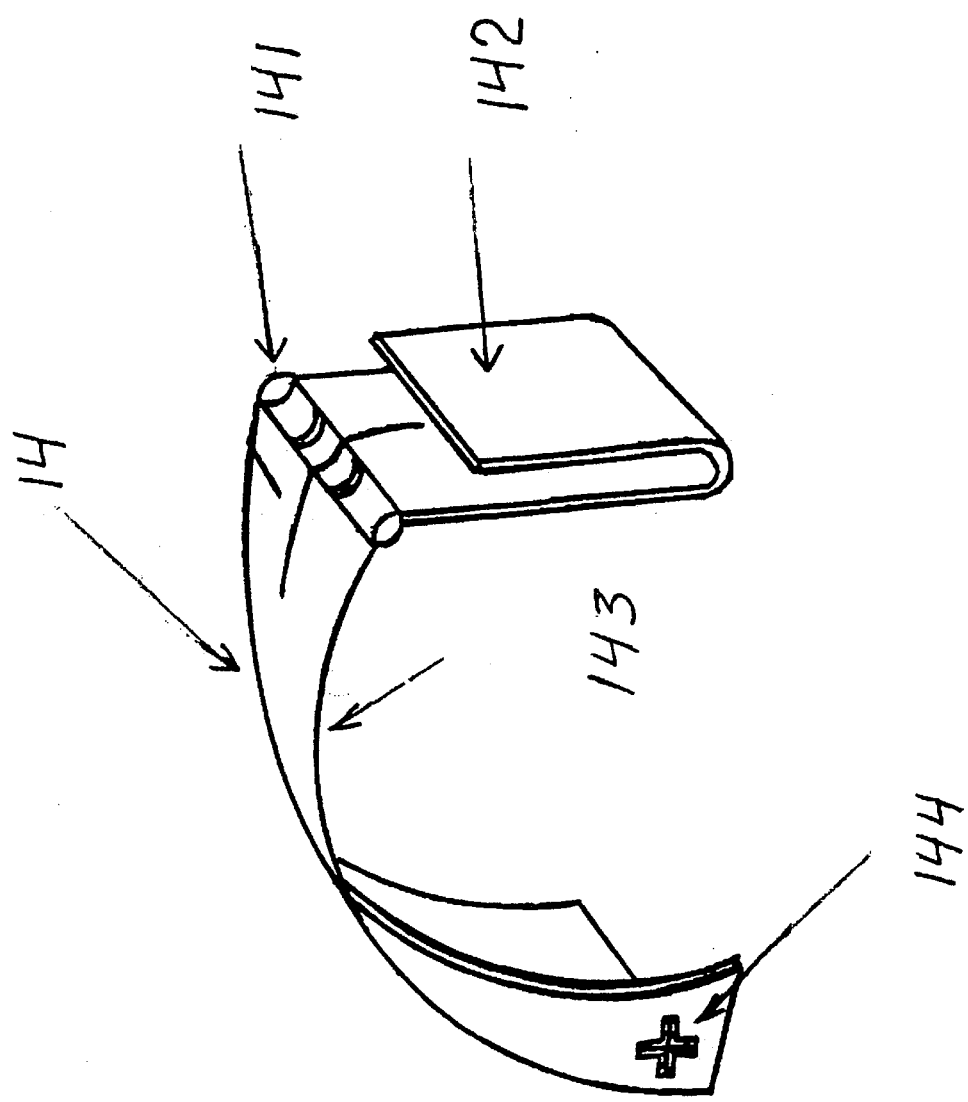
FIG. 5 is a perspective view of the right hinge hook of the present invention.
Figure 6:
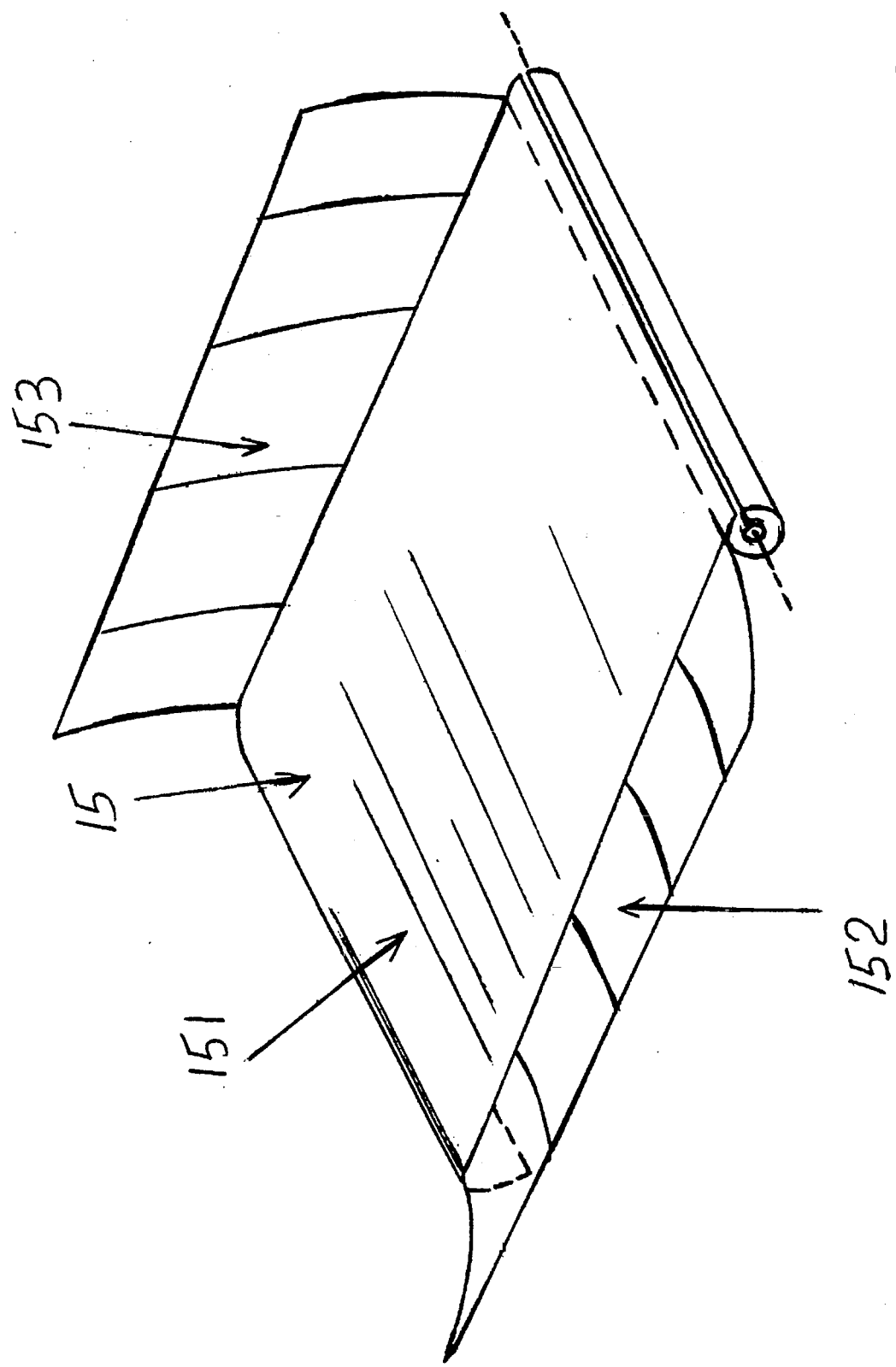
FIG. 6 is a perspective view of the cover of the present invention.

FIG. 1 shows a rear portion of a vehicle with the cover roller housing assembly 10 of the present invention attached to trunk lid 100 in a position outside of the trunk. The roller housing 11 is shown in FIG. 2 and is made out of sheet metal covered with a soft material such as rubber. The roller 12 including a return spring mounted thereon is shown in FIG. 3. The cover 15 (shown in FIG. 6) is wound around roller 12 and the roller 12 is positioned within the roller housing 11 which includes a slot for deployment of the cover therethrough. The roller 12 with the cover 15 and the roller housing 11 positioned thereon is then mounted to the trunk lid edge by a pair of hinge hooks 13, and 14 as illustrated in FIGS. 4 and 5. The left hinge hook 13 includes a generally C-shaped galvanized sheet metal arm 133 with a roller mounting portion 134, a trunk lid edge mounting hook portion 132 and a hinge 131 located between the arm 133 and the hook portion 132. The right hinge hook 14 includes a generally C-shaped galvanized sheet metal arm 143 with a roller mounting portion 144, a trunk lid edge mounting hook portion 142 and a hinge 141 located between the arm 143 and the hook portion 142. The hinge hooks 13 and 14 are covered with a soft material such as rubber. The hinge hooks enable the entire roller housing 11 to be rotated between a position outside of the trunk for deployment of the cover and a position inside of the trunk for storage. The cover 15, as illustrated in FIG. 6, includes a main section 151 and left and right side sections 152 and 153, respectively. The main section 151 covers the top and the front of the vehicle and the side sections 152 and 153 cover the sides of the vehicle when deployed. The cover 15 is made of nylon, vinyl, cotton or other fabrics.

Figure 7:
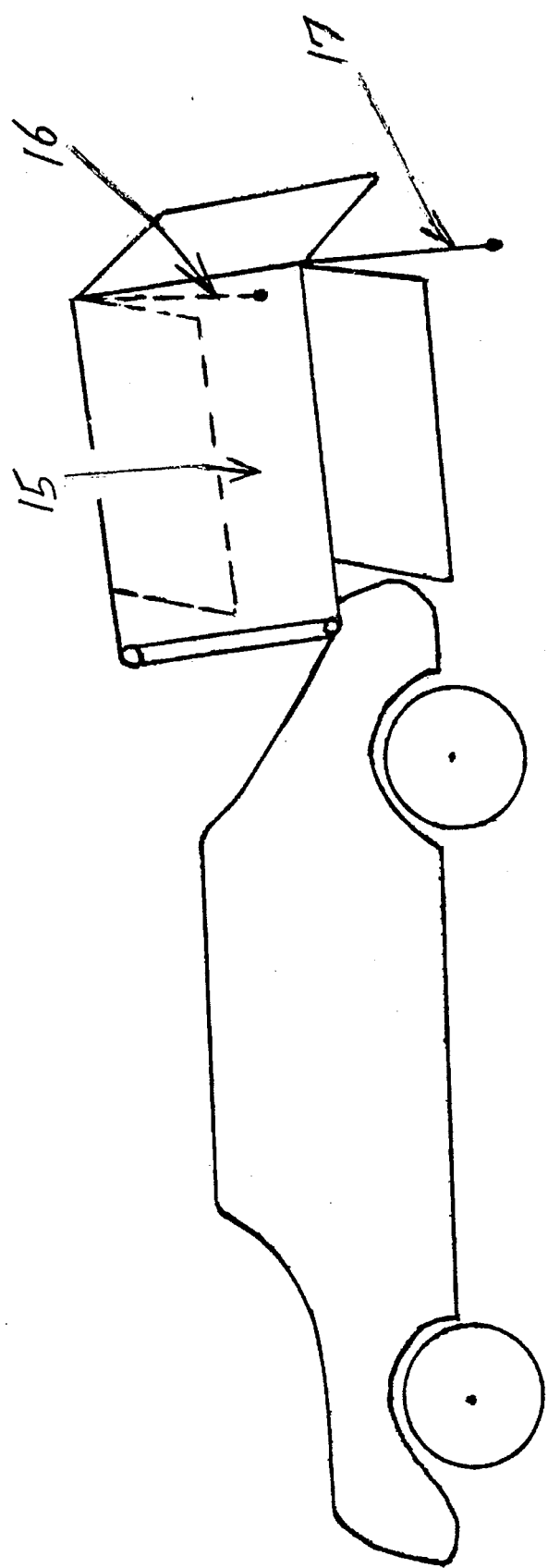
FIG. 7 is a perspective view of the cover of the present invention being used as a tent.

In operation, the housing 11 is positioned outside of the trunk through rotation of the hinge hooks 13 and 14 and the cover 15 is pulled forwardly over the vehicle and secured to the bumper for protecting the vehicle from the elements. Once the cover is deployed the empty housing may be rotated back into the trunk and the trunk then closed. As an alternate use of the cover as a tent the housing 11 is once again positioned outside of the trunk through rotation of the hinge hooks 13 and 14 and the cover 15 is then withdrawn from the housing 11 rearwardly and is supported by a pair of poles 16 and 17, as illustrated in FIG. 7.

After use the cover side sections 152, 153 are folded back onto the main section 151 and the cover 15 is rewound onto the roller and the housing 11 is rotated inside of the trunk for storage.

Further, in case of an emergency such as a broken down vehicle, flat tire or the like, a help message such as help, help needed or the like may be written on the housing 11, as illustrated in FIG. 1, using a phosphoric material. The housing 11 could then be rotated out of the trunk so that the message could be seen any time of the day.

I claim:

1. A cover device for a vehicle wherein the vehicle includes a trunk lid having an edge, the device comprising:

a cover including a main portion and side portions;

a housing assembly for the cover including a roller onto which the cover is selectively wound and a roller housing which houses the roller and the cover;

means for mounting the housing assembly to the edge of the trunk lid;

said means including a pair of hinge hooks, wherein each of said hinge hooks is comprised of an arm portion and a mounting hook portion and a hinge connecting the arm and mounting hook portions; said arm portion including a roller mounting portion for securing the roller thereto and said mounting hook portion mounts the hinge hook to the trunk lid edge;

wherein through rotation of the hinges of the hinge hooks the housing assembly may be rotated between a position outside of the trunk for deployment of the cover out of the housing and a position inside of the trunk for storage.

2. The cover device of claim 1, wherein the cover is deployed over the vehicle for protection thereof.

3. The cover device of claim 1, wherein the cover is deployed rearwardly of the vehicle and is supported from the ground with a pair of poles so as to take the form of a tent structure.

4. The cover device of claim 1, wherein the housing includes an emergency message of a phosphoric material thereon.

* * * * *